United States Patent
Eckart et al.

(10) Patent No.: US 9,857,257 B2
(45) Date of Patent: Jan. 2, 2018

(54) CONTROL DEVICE FOR A VEHICLE WITH A HOUSING HAVING A PRESSURE SENSOR

(71) Applicant: Continental Teves AG & Co. oHG, Frankfurt (DE)

(72) Inventors: Jürgen Eckart, Kipfenberg (DE); Roberto Schlenker, Ingolstadt (DE); Erwin Kreitmeyr, Hohenwart/Koppenbach (DE); Claus Heigl, Ingolstadt (DE)

(73) Assignee: CONTINENTAL TEVES AG & CO. OHG, Frankfurt (DE)

(*) Notice: Subject to any disclaimer, the term of this patent is extended or adjusted under 35 U.S.C. 154(b) by 243 days.

(21) Appl. No.: 14/720,357

(22) Filed: May 22, 2015

(65) Prior Publication Data
US 2015/0338299 A1   Nov. 26, 2015

(30) Foreign Application Priority Data
May 23, 2014  (DE) .................. 10 2014 209 874

(51) Int. Cl.
| | |
|---|---|
| *G01L 7/08* | (2006.01) |
| *B60T 8/171* | (2006.01) |
| *G01L 19/06* | (2006.01) |
| *G01L 19/14* | (2006.01) |
| *G01L 19/00* | (2006.01) |

(52) U.S. Cl.
CPC ............ *G01L 7/08* (2013.01); *B60T 8/171* (2013.01); *G01L 19/0046* (2013.01); *G01L 19/0654* (2013.01); *G01L 19/14* (2013.01)

(58) Field of Classification Search
CPC ....................................... G01L 7/08
USPC ................................................. 73/730
See application file for complete search history.

(56) References Cited

U.S. PATENT DOCUMENTS 8,276,455 B2 * 10/2012 Watanabe ........... G01L 19/0038
                                                                73/700
2007/0089520 A1 * 4/2007 Wanami .............. B60R 21/0136
                                                                73/700
(Continued)

FOREIGN PATENT DOCUMENTS

| DE | 195 44974 C1 | 5/1997 |
| DE | 100 22 124 A1 | 11/2000 |
| DE | 10 2006 040 665 A1 | 3/2007 |

(Continued)

OTHER PUBLICATIONS

German Examination Report—dated Mar. 24, 2015.

*Primary Examiner* — Laura Martin
*Assistant Examiner* — Jean Morello
(74) *Attorney, Agent, or Firm* — Brinks Gilson & Lione

(57) ABSTRACT

A control device (1) for a vehicle with a housing (2) having a pressure sensor (3), arranged in a pressure chamber (4) in a pressure-tight manner with respect to the interior space of the housing (2). The housing (2) having a membrane aperture (2.1) closed by an air-permeable but not water-permeable membrane (5). The housing (2) is designed with a housing duct (6) which in an installation position of the control device (1) extends downward in the vertical direction of the vehicle, and in relation to the volume of the pressure chamber (4) the housing duct (6) has a duct volume in such that with the control device (1) completely immersed in water, a residual volume of air remains upstream of the membrane (5).

7 Claims, 1 Drawing Sheet

(56) References Cited

U.S. PATENT DOCUMENTS

2014/0079964 A1* 3/2014 Gless .................. H01M 2/1072
429/53
2015/0247772 A1* 9/2015 Itou .................... G01L 19/0038
73/720

FOREIGN PATENT DOCUMENTS

| DE | 10 2005 053 014 A1 | 5/2007 |
| DE | 10 2008 043 644 A1 | 5/2010 |
| DE | 10 2009 026 444 A1 | 12/2010 |

* cited by examiner

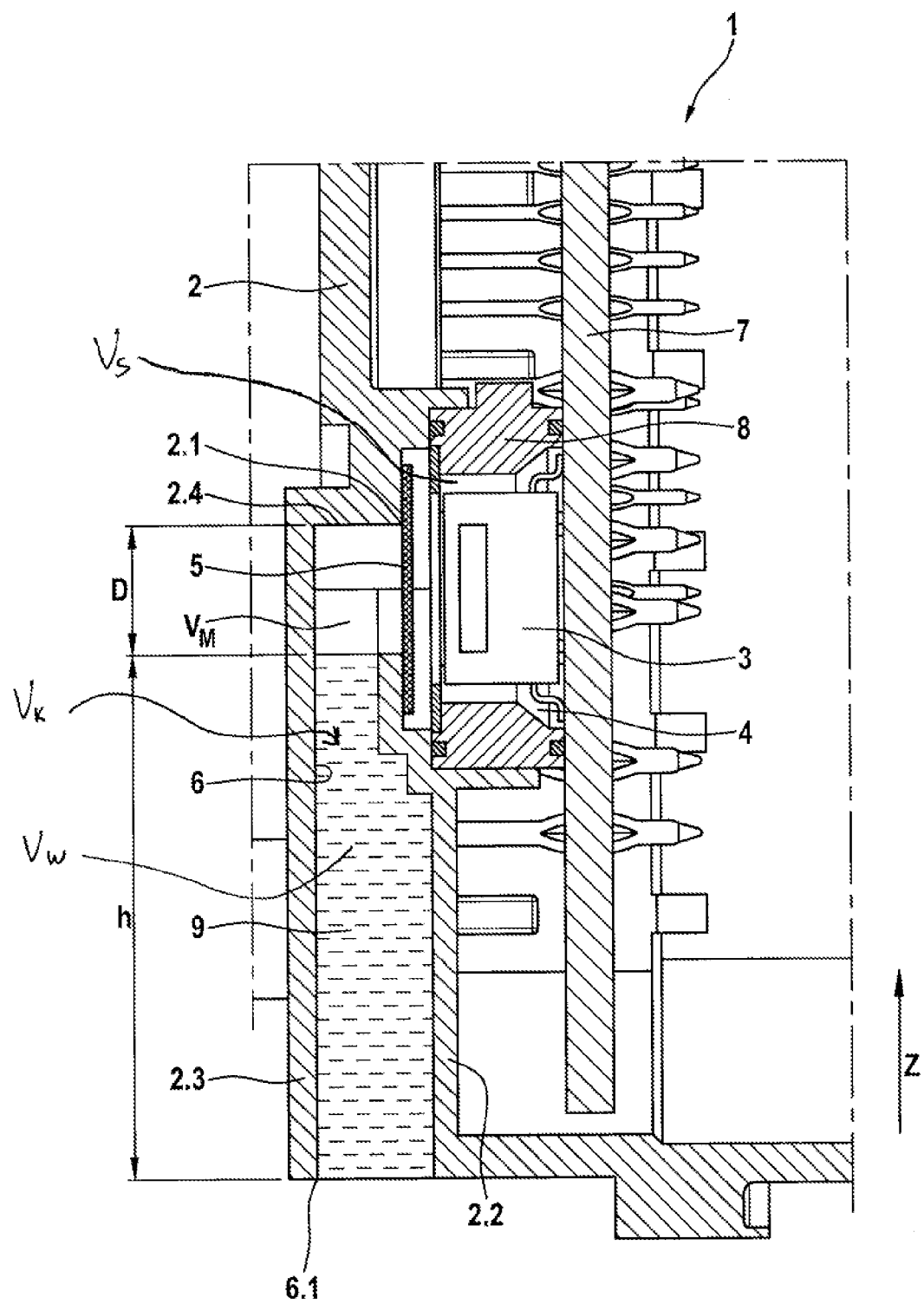

CONTROL DEVICE FOR A VEHICLE WITH A HOUSING HAVING A PRESSURE SENSOR

CROSS-REFERENCE TO RELATED APPLICATIONS

This application claims priority to German Patent Application No. 10 2014 209 874.2, filed May 23, 2014.

FIELD OF THE INVENTION

The invention relates to a control device for a vehicle with a housing having a pressure sensor.

BACKGROUND

A control device of the above referenced general type, for example an ABS/ESC assembly, has been designed with a pressure sensor in order to determine the barometric ambient pressure.

Such a pressure sensor has to be integrated within the control device in such a manner that a direct connection to the external space comes about for the purpose of registering the ambient pressure. To this end, an aperture, covered by a flexible membrane in the housing wall of the control device has been provided, via which an exchange of pressure with the environment can take place. In this case, problems with the pressure measurement may occur if water or other substances cover the region of the membrane. One possibility to minimize this impairment of the pressure measurement consists in covering the region of the membrane by means of a protective plate, as proposed in DE 195 44 974 C1.

DE 195 44 974 C1, describes a control device with a printed circuit board which is arranged in a housing and on which a pressure sensor has been arranged. This housing consists of a housing base and a housing cover connected to the housing base in water-tight manner, whereby a flexible membrane has been integrated within the housing cover, in order to enable an exchange of pressure with the environment via this membrane. However, it has not thereby been ensured in all cases of operation of such a control device that the membrane does not become covered by water. In such a case, no pressure measurement could be carried out.

The entire interior space of the housing of this known control device can be used as a pressure chamber or sensor chamber. Since such an interior-space volume is too large for the transmission of pressure, document DE 195 44 974 C1 proposes forming, within the housing, a pressure chamber in which the pressure sensor has exclusively been arranged. In this case, the membrane is located in the region of this pressure chamber. For the purpose of forming such a pressure chamber, a sleeve has been provided which is sealing with respect to the interior space of the control device and which surrounds the pressure sensor in such a manner that only a small volume is available for transmitting pressure.

The object of the present invention consists in designing the aforementioned control device with a pressure sensor in such a manner that the wetting with water of the membrane enabling the exchange of pressure with the environment is prevented under all circumstances.

This object is achieved by a control device with the features described herein.

SUMMARY AND INTRODUCTORY DESCRIPTION OF THE INVENTION

A control device for a vehicle with a housing having a pressure sensor is provided in accordance with this invention, in which the pressure sensor has been arranged in a pressure chamber delimited in a pressure-tight manner with respect to the interior space of the housing, the housing exhibits in the region of the pressure chamber a membrane aperture closed by an air-permeable but not water-permeable membrane, and the pressure chamber and the pressure sensor can be pressurized with an ambient pressure via the membrane, is distinguished, in accordance with the invention, by the fact that the housing has been designed with a housing duct which in an installation position of the control device extends downward in the vertical direction of the vehicle, starting from the membrane aperture, and in relation to the volume of the pressure chamber the housing duct has been designed with a duct volume in such a manner that with the control device completely immersed in water a residual volume of air, arising for the equalization of pressure with the ambient pressure, remains upstream of the membrane.

With such a control device according to the invention, the ratio of the volume of the pressure chamber to the volume of the housing duct has been adjusted in such a manner that even with a control device completely immersed in water and with maximally varying ambient pressure, the ambient pressure can be measured by the pressure sensor without restriction, since in all possible cases of operation a residual volume of air remains upstream of the membrane. To this end, it is of course necessary that in the installation position of the control device in the vehicle the housing duct extends perpendicularly downward—that is to say, downward in the vertical direction of the vehicle—so that the membrane aperture of this housing duct points downward or is open in the downward direction. In the case of immersion of the control device in water, the water level in the housing duct therefore never rises so far that the membrane is reached. The residual volume of air remaining in the region of the membrane therefore ensures the equalization of pressure through this membrane leading to the pressure chamber.

According to an advantageous configuration of the invention, the membrane aperture has been formed in the housing in such a manner that the plane of the membrane has been oriented in the vertical direction of the vehicle, the residual volume of air being determined from the height of the membrane extending in the vertical direction of the vehicle—that is to say, from the diameter thereof in the vertical direction of the vehicle. Hence the housing of such a control device can be realized in structurally simple manner.

According to a further advantageous development of the invention, the pressure sensor has been arranged on a printed circuit board.

Finally, for the purpose of forming the pressure chamber, a sealing ring has been provided in accordance with the invention in such a manner that the sealing ring, together with the printed circuit board and a housing wall in the region of the membrane, forms the pressure chamber. Hence by means of such a pressure chamber it is possible to realize a small volume for the pressure measurement, so that the volume of the housing duct can also be kept small in relation to this volume.

BRIEF DESCRIPTION OF THE DRAWINGS

In the following, the process according to the invention will be described in greater detail with reference to the single appended FIGURE. This FIG. 1 shows a sectional partial representation, along a section line in the vertical direction of the vehicle, of a control device according to the invention.

FURTHER DESCRIPTION OF THE INVENTION

FIG. 1 shows a control device 1, for example an ABS/ESC assembly of a vehicle (not represented) in the installation position thereof. This control device 1 includes a housing 2 for receiving a printed circuit board 7 extending in the vertical direction (z-direction) of the vehicle, whereby electronic components and a pressure sensor 3 have been arranged on the printed circuit board 7. FIG. 1 does not show this housing 2 completely but shows only that region in which the pressure sensor 3 has been arranged.

The pressure sensor 3 is located in a pressure chamber 4 between the printed circuit board 7 and a wall 2.2 of the housing 2 extending in the vertical direction (z-direction) of the vehicle. This pressure chamber 4 is formed by a sealing ring 8, surrounding the pressure sensor 3, together with the printed circuit board 7 and the housing wall 2.2. In the region of this pressure chamber 4 there is located in the housing wall 2.2 a membrane aperture 2.1 which is covered by an air-permeable but not water-permeable membrane 5. This membrane 5 is accordingly air-permeable but not permeable to water, so that by this means an exchange of pressure with the environment of the control device 1 is possible. The plane of this membrane 5 extends likewise in the vertical direction (z-direction) of the vehicle. With the sealing ring 8, a pressure chamber 4 is created which has been sealed with respect to the remainder of the interior space of the housing 2 for the purpose of preventing an exchange of pressure. This pressure chamber 4 therefore exhibits a very small volume as a sensor chamber for the pressure sensor 3.

The communication of pressure into the pressure chamber 4 is effected via a housing duct 6 as a pressure-intake duct, which extends in the longitudinal direction (z-direction) of the vehicle, starting from the membrane aperture 2.1, downward in the direction of the roadway (not represented) and terminates in a pressure-intake aperture 6.1. This pressure-intake aperture 6.1 is aligned with the external surface of the housing 2 pointing in the direction of the roadway. The housing duct 6 is formed by the housing wall 2.2 together with a duct wall 2.3 extending substantially parallel to said housing wall and also by further duct walls arranged to be perpendicular to said walls. This housing duct 6 may exhibit, for example in the lower region, a cross section of 3.5 mm×8 mm. In the upper region of the housing duct 6—that is to say, in the region of the sealing ring 8—the housing duct narrows as far as the upper end 2.4 of the housing duct 6, which is aligned with the edge of the membrane aperture 2.1.

The ratio of the volume $V_S$ of the pressure chamber 4 to the volume $V_K$ of the housing duct 6 has been adjusted in such a way that even in the event of submersion of the entire control device 1 in water and with maximally varying ambient pressure, i.e. maximal difference in altitude and maximally occurring difference in temperature, the ambient pressure of the control device 1 can be measured without restriction; accordingly, in no case can water in the housing duct 6 rise so far that it reaches the membrane 5, not even partly.

In FIG. 1, a water column 9 has been represented in the housing duct 6, the level h of which reaches just as far as the edge of the membrane aperture 2.1, so that the membrane 5 is not covered by water. Above the water column 9 with the level h there adjoins, as far as the upper end 2.4 of the housing duct 6, a membrane chamber $V_M$, located upstream of the membrane 6, as a residual volume of air, the height of which in the z-direction corresponds to the diameter D of the membrane aperture 2.1 closed by the membrane 5. The ratio of the volume $V_S$ of the pressure chamber 4 to the volume $V_K$ of the housing duct 6 has been adjusted in such a way that, in the event of submersion of the entire control device 1 in water and with maximally varying ambient pressure, a water column 9 can be drawn only so far into the housing duct 6 that at least a residual volume of air remains which corresponds at least to the membrane chamber $V_M$, and consequently an equalization of pressure via the membrane 5 leading to the pressure chamber 4 is always ensured.

Such a design of the pressure chamber 4 and of the housing duct 6 will be elucidated in the following on the basis of an exemplary calculation.

Let it be assumed that the vehicle with the control device 1 is located at an altitude of 4000 m with an air pressure p1 of 0.616 bar. In this case, the temperature of the air in the housing duct 6 is to amount to 100° C.; accordingly, T1=373 K.

The volume $V_S$ of the pressure chamber 4 amounts to 308 mm³, the volume $V_K$ of the housing duct 6 is composed of the membrane chamber $V_M$ of, for example, 61 mm³ and the volume $V_W$ adjoining beneath the membrane chamber $V_M$ of, for example, 563 mm³. This volume $V_W$ corresponds to the volume of the water column 9 with level h that has been drawn in FIG. 1. Hence a duct volume $V_K$ of 624 mm³ results. The entire volume V1 consisting of the duct volume $V_K$ and the pressure-chamber volume $V_S$ therefore amounts to 932 mm³.

Now if this control device 1 is immersed in 0° C. cold water (T2=273 K) and the vehicle drives down from the altitude of 4000 m to sea level with an air pressure of p2=1.013 bar, water is drawn into the housing duct 6 by reason of the cooling of the air with the volume V1=932 mm³ to a volume V2 in the control device 1, and also by reason of the rise of the external pressure from 0.616 bar to 1.013 bar.

The changed volume V2 of the air enclosed in the control device after this event can be calculated by means of the ideal-gas equation p×V/T=const. and the quantities quoted above. From the equation p1×V1/T1=p2×V2/T2 a value of 415 mm³ results for the volume V2.

In order that the aforementioned condition, namely that the space upstream of the membrane 5—that is to say, the membrane chamber $V_M$—remains free from water, the following condition must hold:

$$V2 \geq V_S + V_M. \quad (1)$$

With the calculated value for V2 it holds that: V2=415 mm³≥369 mm³.

Hence condition (1) is satisfied. The air pressure in the housing duct 6 and in the pressure chamber 4 therefore still remains at the level of the ambient pressure.

If the volume V2 were to correspond exactly to the value 369 mm³, the water column 9 with a level h would be located in the housing duct 6, corresponding to the representation according to FIG. 1. The membrane chamber $V_M$ upstream of the membrane 5 is not filled up with water of the water column 9.

By reason of external pressure and temperature, the volume of air in the housing duct 6 varies in such a manner that the water level of the water column 9 can attain both a lowest level and a highest level. Precisely in the case of the highest level it is ensured that the equalization of air pressure by the membrane 5 is possible without hindrance. Otherwise, if the water were to reach as far as the membrane 5, in the worst case if it were to cover the membrane completely, an equalization of pressure with the environment would no longer be possible.

In the exemplary embodiment described above according to FIG. 1, the plane of the membrane 5 and also the direction of the housing duct 6 extend in the vertical direction of the vehicle—that is to say, in the z-direction. It is also possible to design the housing 2 of the control device 1 in such a manner that the membrane 5 extends perpendicularly to the vertical direction of the vehicle—that is to say, to the z-direction. In this case, the value of the membrane chamber $V_M$ as residual volume of air can be predetermined, so that in the event of submersion of the entire control device 1 in water and with maximally varying ambient pressure, i.e. maximal difference in altitude and maximally occurring difference in temperature, the ambient pressure of the control device 1 can be measured without restriction; accordingly, in no case can water in the housing duct 6 rise so far that no spacing would any longer exist between the horizontally extending membrane 5 and the level of the water column 9.

While the above description constitutes the preferred embodiment of the present invention, it will be appreciated that the invention is susceptible to modification, variation and change without departing from the proper scope and fair meaning of the accompanying claims.

The invention claimed is:

1. A control device for a vehicle with a housing having a pressure sensor, comprising:
   the pressure sensor arranged in a pressure chamber delimited in a pressure-tight manner with respect to the interior space of the housing,
   the housing forming in the region of the pressure chamber a membrane aperture closed by an air-permeable but not water-permeable membrane,
   the pressure chamber and the pressure sensor pressurized with an ambient pressure via the membrane,
   the housing having a housing duct which, in an installation position of the control device, extends downward in the vertical direction of the vehicle, starting from the membrane aperture, and
   in relation to the volume of the pressure chamber the housing duct is formed with a duct volume in such a manner that with the control device completely immersed in water a residual volume of air, arising from the equalization of pressure with the ambient pressure, remains upstream of the membrane.

2. The control device as claimed in claim 1, further comprising in that the membrane aperture in the housing is arranged in a manner that the plane of the membrane is oriented in the vertical direction of the vehicle, the residual volume of air being determined from the height of the membrane extending in the vertical direction of the vehicle.

3. The control device as claimed in claim 1 further comprising in that the pressure sensor is arranged on a printed circuit board.

4. The control device as claimed in claim 3, further comprising in that for the purpose of forming the pressure chamber a sealing ring is provided in such a manner that the sealing ring, together with the printed circuit board and a housing wall in the region of the membrane, forms the pressure chamber.

5. The control device as claimed in claim 1 further comprising wherein the pressure chamber defines a volume $V_s$, the membrane forming a membrane chamber together with an upper end of the housing duct having a volume $V_m$, and the column beneath the membrane chamber defining a volume $V_w$, and wherein the sum of volumes $V_m$ and $V_w$ defining a volume $V_k$, and a total of volume V1 is defined as the sum of volumes $V_k$ and $V_s$, and wherein the volume V1 undergoes a volume change to become a changed volume V2 due to a change in atmospheric condition of the vehicle of at least one of altitude, barometric pressure, and temperature, and wherein the following relationship is observed:

$$V2 \geq V_s + V_m.$$

6. The control devices claimed in claim 5 wherein the relationship is satisfied with changed volume V2 occurring due to a change in an initial condition of the vehicle at 4000m altitude, ambient temperature of 100° C., and atmospheric pressure of 0.616 bar, to a changed condition of 0m altitude, 0° C., and 1.013 bar.

7. A control device for a vehicle with a housing having a pressure sensor, comprising:
   the pressure sensor arranged in a pressure chamber delimited in a pressure-tight manner with respect to the interior space of the housing,
   the housing forming in the region of the pressure chamber a membrane aperture closed by an air-permeable but not water-permeable membrane,
   the pressure chamber and the pressure sensor pressurized with an ambient pressure via the membrane,
   the housing having a housing duct which, in an installation position of the control device, extends downward in the vertical direction of the vehicle, starting from the membrane aperture, and
   in relation to the volume of the pressure chamber the housing duct is formed with a duct volume in such a manner that with the control device completely immersed in water a residual volume of air, arising from the equalization of pressure with the ambient pressure, remains upstream of the membrane;
   wherein the duct volume is greater than the volume of the pressure chamber.

* * * * *